(Model.)

W. D. LINDSLEY.
Corn Planter.

No. 243,585.          Patented June 28, 1881.

WITNESSES:
W. W. Hollingsworth
John A. Kenion

INVENTOR:
W™ D. Lindsley
BY
ATTORNEYS.

N. PETERS, Photo-Lithographer, Washington, D. C.

UNITED STATES PATENT OFFICE.

WILLIAM D. LINDSLEY, OF STERLING, ASSIGNOR TO HIMSELF AND E. V. SNIVELY, OF WATHENA, KANSAS.

CORN-PLANTER.

SPECIFICATION forming part of Letters Patent No. 243,585, dated June 28, 1881.

Application filed April 22, 1881. (Model.)

*To all whom it may concern:*

Be it known that I, WILLIAM D. LINDSLEY, of Sterling, Rice county, Kansas, have invented a new and useful Improved Corn-Planter; and I do hereby declare that the following is a full, clear, and exact description of the same, reference being had to the accompanying drawings, forming part of this specification, in which—

Figures 1, 2:
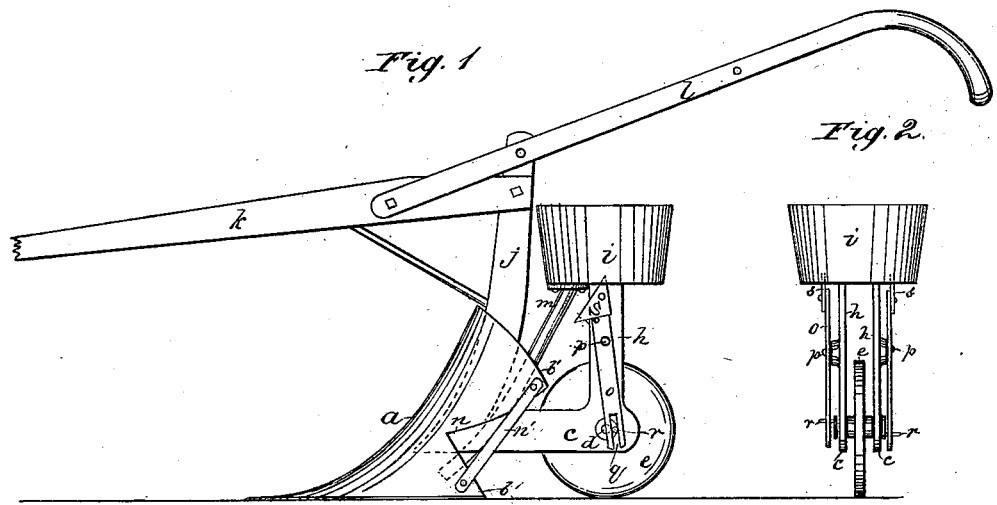
Figure 3:
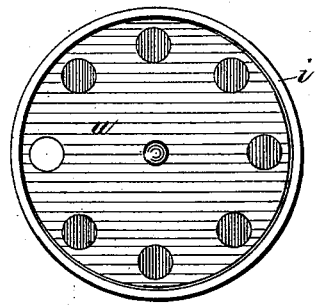
Figure 4:
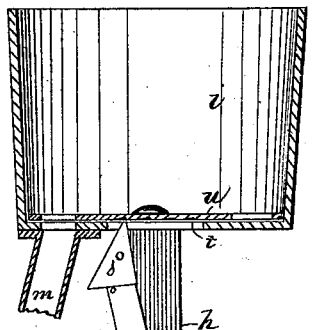
Figure 5:
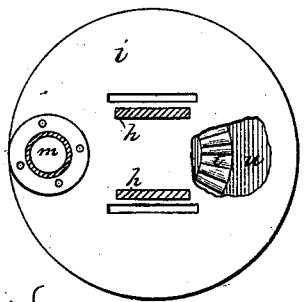

Figure 1 is a side elevation of my improved corn-planter. Fig. 2 is a rear elevation of the same. Fig. 3 is a plan of the hopper. Fig. 4 is a vertical section of same, and Fig. 5 bottom view of hopper.

My invention relates to improvements in corn-planters; and it consists, first, in the peculiar construction and arrangement of the devices whereby the corn in the hopper is fed into the spout.

My invention further consists in the construction of the plow for opening a corn-furrow, which plow is so formed as to cover the corn with soil raised by the point of the plow from near the bottom of the furrow, and with the mold-board so shaped as to throw the upper portion of the furrow-slices containing the weeds on the sides of the furrow, as hereinafter more fully set forth.

In the accompanying drawings, $a$ represents a plow provided with inclined mold-boards $b$ $b$ on each side, intersecting each other in a central ridge, and extending backward some distance, forming rear elevated extensions, $b'$, as shown in the drawings.

$c$ $c$ represent two parallel longitudinal bars secured at their front ends to the back face of the plow $a$. Holes are made near the rear ends of the bars $c$, which serve as journal-bearings for the axle $d$ of the driving-wheel $e$.

$h$ $h$ are standards secured to the rear ends of the longitudinal bars $c$ $c$, and supporting at their upper ends the hopper $i$, for the reception of the corn to be planted.

$j$ represents the plow-standard, the lower end of which passes between the bars $c$ $c$, and is bolted thereto.

$k$ is the plow-beam, and $l$ $l$ are the handles, bolted, in the usual manner, to the plow standard and beam.

$m$ is a feed-spout, the upper end of which opens into the bottom of the hopper, the spout thence being inclined downwardly over the furrow made by the plow, and in rear of the latter.

The inclined mold-boards $b$ $b$ are each provided with an angular opening, $n$, and scrapers $n'$, for the purpose of scraping off as much of the bottom of the furrow-slice as may be desired. These angular openings $n$ in the mold-boards lie opposite each other on each side of the plow $a$, and the lower end of the feed-spout extends down and lies opposite and between the vertices of the angular openings $n$, so that the corn is dropped into the furrow opposite the vertices of the angular openings $n$, and the soil raised by the plow-point passes up over the mold-boards in the forward motion of the plow, and, passing through the angular openings, covers the corn, a part of the furrow-slices riding up the mold-boards in rear of the angular openings $n$ and turned into the sides of the furrow.

$o$ represents a lever, pivoted at $p$ to one of the standards $h$, and provided at its lower end with a slot, $q$, which straddles a pin, $r$, arranged eccentrically on the end of the axle $d$ of the driving-wheel $e$. The upper end of the lever $o$ is provided with a dog, $s$, the upper end of which passes through a slot in the bottom of the hopper and engages with ratchet-teeth $t$ on the bottom of a disk, $u$, centrally pivoted to the bottom of the hopper, and provided with a series of holes or pockets for the reception of corn.

What I claim as my invention is—

1. The plow $a$, provided with inclined mold-boards $b$ $b$, with rear extensions, $b'$, and angular openings $n$, lying opposite each other, and scrapers $n'$, substantially as described.

2. The combination, with the plow $a$, provided with inclined mold-boards $b$, rear extensions, $b'$, and angular openings $n$, with scrapers $n'$, of the feed-spout $m$, having its lower end arranged between the vertices of the angular openings $n$, substantially as described.

3. The combination, with the slotted lever $o$, having a dog, $s$, and axle $d$, provided with the eccentrically-arranged pin $r$, of the slotted hopper $i$, intermittently-rotating disk $u$, centrally pivoted to the bottom of the hopper, and having ratchet-teeth $t$ on its bottom, and provided with a series of pockets near its circumference, and feed-spout $m$, substantially as described.

4. The combination of the plow $a$, constructed as set forth, bars $c$, axle $d$, having eccentric-pin $r$, driving-wheel $e$, standards $h$, slotted lever $o$, having dog $s$, disk $u$, having ratchet-teeth $t$, and pockets, and feed-spout $m$, substantially as described, and for the purpose set forth.

WILLIAM DARWIN LINDSLEY.

Witnesses:
ELSWORTH A. MAPES,
G. W. ANTHONY.